Dec. 13, 1960 M. L. ARGABRIGHT 2,964,701
PROCESS AND APPARATUS FOR TESTING CIRCUITS
Filed March 11, 1959 2 Sheets-Sheet 1
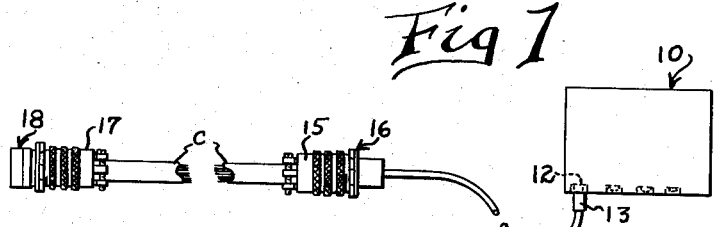
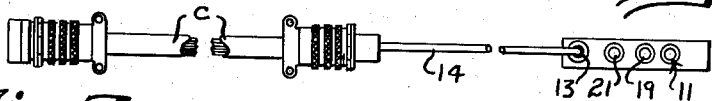
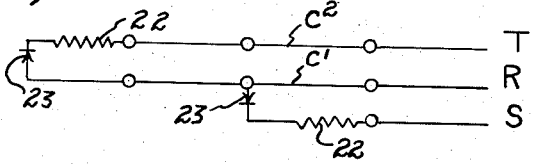
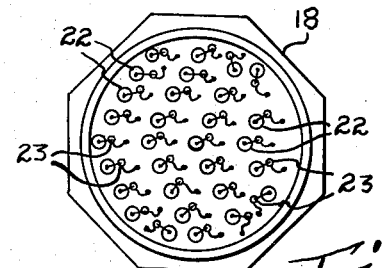
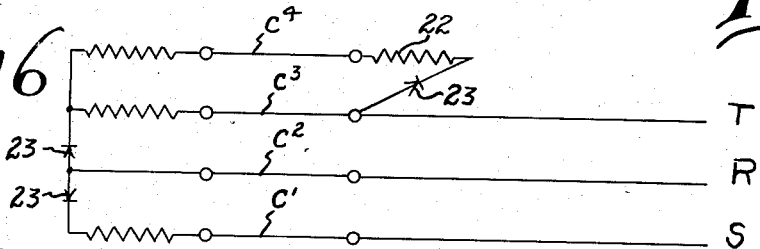
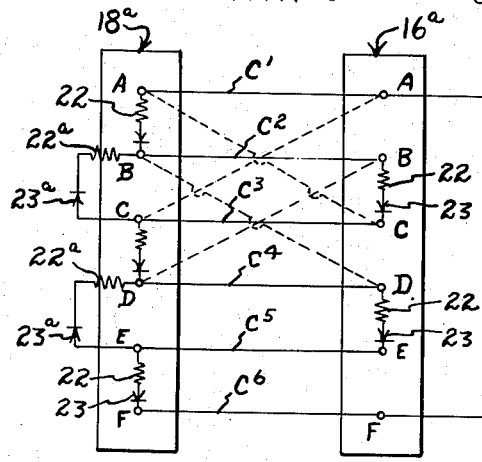
INVENTOR.
Marvin L. Argabright
BY
Jennings, Carter & Thompson
Attorneys

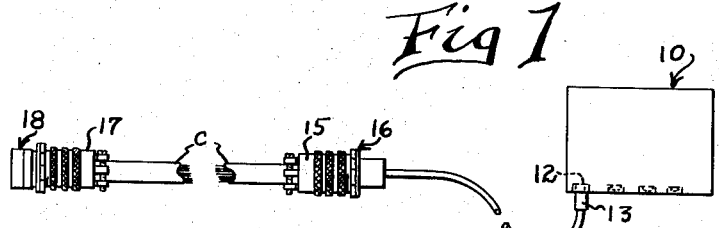
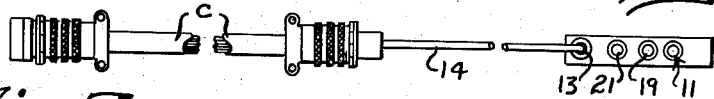
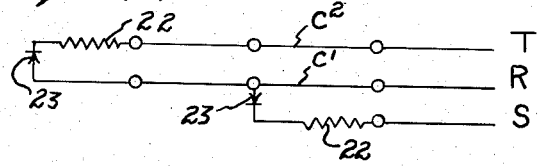
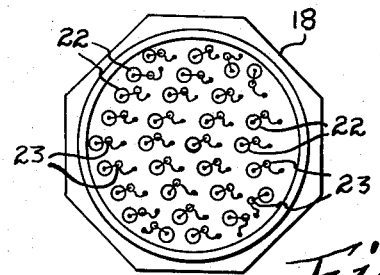
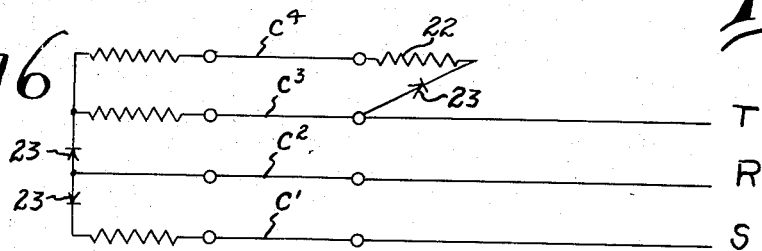
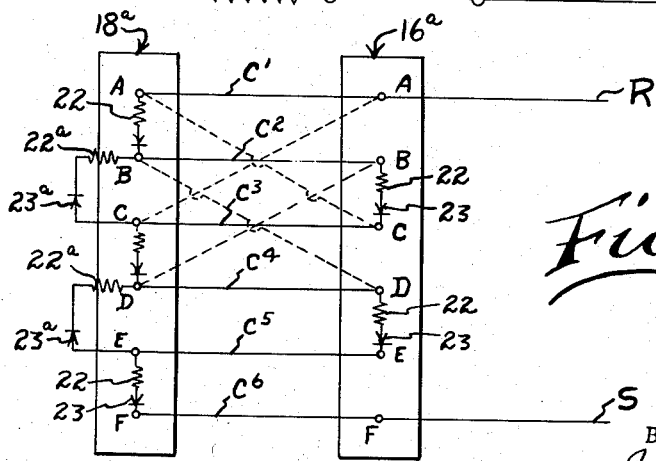
INVENTOR.
Marvin L. Argabright

United States Patent Office 2,964,701
Patented Dec. 13, 1960

2,964,701

PROCESS AND APPARATUS FOR TESTING CIRCUITS

Marvin L. Argabright, Birmingham, Ala., assignor to Hayes Aircraft Corporation, a corporation of Alabama Filed Mar. 11, 1959, Ser. No. 798,776

6 Claims. (Cl. 324—51)

My invention relates to a process and apparatus for carrying out the same which may be used simultaneously and effectively to test a plurality of circuits.

In the art to which this invention relates and particularly with the advent of modern airplanes and guided missiles, it is imperative that large numbers of circuits be tested not only for their electrical integrity as circuits but for their alignment or correctness of connection with respect to devices at the ends of the circuits. Heretofore, the only way known to me to test a plurality of circuits, for instance all of the circuits in a multi-circuit cable, was, to electrically connect the ends of each wire of the cable, one at a time, to suitable instruments and to impress a voltage on the individual wires, one at a time, to determine whether or not the circuits were good. As will be appreciated, this is a laborious and time consuming process and due to the same personal factors involved which may result in the wires being connected to the wrong pins or sockets in the beginning, a test for such connection is not entirely accurate. For instance, modern aircraft contain many cables in which there may be as many as 100 separate circuits, all being connected to standard pin and socket connectors at the ends. The wiring scheme for which the cable is used requires that each pin in the fitting at one end of the cable be connected to a given socket in the fitting at the other end of the cable. Consequently, the misalignment of even one connection may be fatal to the functioning of an important component of the aircraft, missile, or other piece of equipment.

In view of the foregoing the principal object of my invention is to provide a process and apparatus of the character designated in which a plurality of circuits may be simultaneously tested both for correctness of connection with end connectors and for integrity.

Another object is to provide a process and apparatus for testing multi-conductor cables in which the conductors thereof all are placed in series with each other through series connected diodes and resistors, said conductors then being connected to form one leg of a bridge network which is in balance if the several circuits all are good, whereby if the bridge becomes unbalanced this fact indicates the presence of a fault or misconnection in at least one of the conductors.

Another object of my invention is to provide a process and apparatus for testing the individual condition of each circuit of a multi-circuit cable which includes the steps and the means for increasing the resistance of the circuits of the cable to a point that the resistance thereof may be measured, connecting in series with the circuits diodes or like devices which permit a flow of current in one direction only through the connected conductors, and then in using a change in resistance of the entire group of circuits to indicate certain faults in the individual circuits of the cable, if such faults be present.

A further object of my invention is to provide apparatus for simultaneously testing each circuit of a multi-circuit cable which comprises a very small, compact, self-contained unit which may easily be carried around in the hand of the operator and which is effective to test cables of any length, the actual test being completed substantially instantaneously upon the closing of a single switch.

Briefly, my invention may comprise a pair of adaptor units disposed to be connected into the respective pin and socket connectors installed permanently on the ends of the cable. Carried in one of the adaptors and connected to the pins or sockets thereof as the case may be are series connected diodes and resistors, one diode and one resistor in series for each circuit of the cable. These are so wired that by merely plugging the adaptor into the cable the ends of the wires of the cable are automatically connected in series with each other. At the other end of the cable I plug in a second adaptor which likewise includes series connected resistors and diodes, one for each of the wires of the cable except two (although three preferably are left unconnected as will be explained). This adaptor is so disposed with its resistors and diodes permanently installed in the cavity thereof that the plugging in of this adaptor to the socket on the end of the cable in question puts all the wires except two thereof, or three as will be explained, in series. Therefore, the net effect of simply plugging in the adaptors of my invention is to connect all of the wires together by unidirectional current flow means and through resistors which have a value sufficient to raise the resistance of each circuit to a measurable value. Therefore, when a voltage is impressed upon the thus connected circuits any current that flows therethrough flows in a unidirectional path and through a resistance which is higher than the resistance of each circuit of the cable. I now connect the two or three wires, as the case may be, into a bridge network. The bridge network is balanced by means of a potentiometer or like instrument so that when a voltage is impressed on that leg of the bridge which in effect is the series connected conductors, no current flows unless the resistance of the entire group of conductors is changed over what the same would be if all of the circuits of the cable are good and intact. Furthermore, due to the provision of the diodes it will be apparent if there are wires which are misconnected with respect to a predetermined pattern as between the end connectors on the cable, this will appear as an unbalancing of the circuit, causing current to flow through the cables and indicating a fault. It will be understood that if a fault is indicated the cable in question may be returned to the work bench there to be completely checked again. That is, the precise nature of the fault is of no consequence insofar as the present invention is concerned, it being only desirable to determine if there be a fault either of integrity or connection.

Apparatus illustrating the constructional features of my invention and which also may be used to carry out my improved process is illustrated in the accompanying drawings forming a part of this application, in which:

Fig. 1 is a fragmental plan view of my improved apparatus showing the same connected to a length of cable to be tested;

Fig. 2 is a side elevational view of the apparatus shown in Fig. 1;

Fig. 3 is an end view of one of the adaptors showing the mounting therein of the resistors and diodes;

Fig. 4 is a diagrammatic, enlarged, fragmental sectional view of the adaptors and end fittings, the parts being separated for clarity;

Fig. 5 is a wholly diagrammatic wiring diagram;

Fig. 6 is a fragmental wiring diagram showing my improved apparatus adapted to test a cable having four circuits;

Fig. 7 is a view showing my improved apparatus arranged to test a cable having only two circuits; and, Fig. 8 is a wiring diagram showing a modified form of my invention which eliminates the likelihood of the bridge remaining balanced in the event the several circuits are misconnected according to a pattern.

Referring now to the drawings for a better understanding of my invention, I show in Fig. 1 a case or housing 10 which may be a small box of approximately 6 inches long by 5 inches wide by 2 inches thick. The box may have mounted therein a pushbutton indicated generally by the numeral 11. A socket 12 may be provided in which there is adapted to be inserted the usual phone jack 13 to make the connection for the three circuits which are included in the cable indicated at 14 and which lead from my improved apparatus.

Cable 14 leads into an adaptor unit indicated generally at 16 and which is disposed for connection to one of the standard connectors 15 on the end of a cable C to be tested. At the other end of the cable C is the second of my improved adaptors indicated at 18 disposed for plug in connection to the other of the standard terminal connectors 17. It will be understood that in the adaptors 16 and 18 are housed the series connected diodes and resistors which heretofore have been mentioned. It will further be appreciated that the size of these resistors and diodes is such that as many as 100 of the series connected units may be placed in an adaptor which is no more than 2 inches in diameter and which has a cavity therein of only about 2½ inches long.

The case 10 also embodies signal lamps indicated at 19 and 21, the lamp 19 being green and the lamp 21 being red, all for a purpose presently to appear.

Referring now particularly to Fig. 5 of the drawings which is a wholly diagrammatic wiring diagram, the circuits of my improved testing apparatus will now be explained. Essentially, and from an inspection of Fig. 5 it will be seen that the adaptors 16 and 18, by being plugged into the end plugs 15 and 17, respectively, in effect connect the cable C as legs of a bridge network. Furthermore, in the adaptors the diodes 23 form unidirectional paths for any current which might flow in the entire cable C, through the individual circuits thereof, and the resistors 22 serve to increase the resistance of the entire cable.

At 24 I show a polarized relay which may be biased to neutral position by any suitable means, not shown. The switch arm 26 of relay 24 is connected by a lead 27 to a point A of the bridge network. A lead 28 connects point A to one end of a variable resistor 29. The other end of resistor 29 is connected to point B of the bridge. A line 31 connects point B of the bridge to one end of a resistor 32. A line 33 connects the other end of resistor 32 to point C of the bridge. It will be understood that the coil 24 of the relay is connected by leads 34 and 36 across the points B and C of the bridge network which are points of equal potential thereon when the complete bridge network is in balance.

In the cable 14 are three wires which are indicated by the leters T, R and S these designations being used to indicate the tip, ring, and sleeve of the usual three connector jack indicated at 13 in Fig. 1. The lead T is connected as indicated to the point C of the bridge network. The lead R is connected by a branch lead 37 to the point A of the bridge network. The lead S is connected to one of the fixed contacts 38 which will be contacted by the switch arm 26 when current flows through the relay 24 in one direction. The opposite fixed contact 39 is connected by a lead 41 to the lead T, whereby the switch arm 26 will make contact with the contact 39 when current flows through the relay 24 in the opposite direction.

Connected across the line S to the point B of the bridge network is a variable resistor 42. At 43 I indicate a battery having one of its terminals connected by a line 44 both to the lead R and to the point A of the bridge network through line 37.

The switch 11 is a double or tier type pushbutton switch as shown. The other terminal of the battery 43 is connected by a line 45 to one contact 46 of one tier of the switch 11. The other contact 47 is connected by a line 48 to the slide wire 49 associated with the resistor 32 as illustrated.

The stationary contact 51 of the second tier of switch 11 is connected by a line 52 to one side of the green colored signal lamp 19. The other fixed contact 53 is connected by line 55 to a second battery 56. Line 54 connects stationary contact 57 of the relay to line 52. A second contact 58 is cross connected by a lead 59 to the lead 54. A lead 61 connects one side of the red lamp 21 to the point A of the bridge. A lead 62 connects the other side of the red signal lamp to the other side of battery 56 from the line 55.

From the foregoing the method of carrying out my improved process and of constructing and using my improved apparatus may now be explained and understood. First, it will be understood that the resistors and diodes in the adaptors 16 and 18 are wired to accommodate the individual cable to be tested. That is, if the cable C has say 60 circuits, the adaptor 18 will have thirty of the series connected diodes 23 and resistors 22 so connected to the pins or sockets as the case may be than when plugged into the far end of the cable the individual circuits will be connected as illustrated. Adaptor 16 have fifty-seven of the resistor-diode combinations as shown. It will be understood that the bridge network already has been put in balance by moving the slide wires of the several resistors to positions corresponding to zero current flow from points B to C in the event all of the circuits of the cable C are intact and properly aligned. With the bridge network thus balanced and with the adaptors 16 and 18 plugged into the cable C, and the jack 13 plugged into its socket 12, the test is made simply by momentarily closing pushbutton 11. If the circuits of the cable C all are good and if the current flows through all of the circuits so that none of the resistors 22 are cut out of the circuit, as when the individual circuits of cable C all are properly aligned, it will be apparent that only the green light 19 is energized from battery 56, indicating that each circuit is good. It will be understood that the lamp 21 is selected relative to the resistance of lamp 19 so that the lamp 21 acts as a circuit for the lamp 19 but does not incandesce until current flows through the path 55, 54, 26, 61 and battery 56. Therefore, only when the resistance of the cable C is less or infinitely greater than enough to keep the bridge in balance does the relay 24 receive current. In this case the switch arm 26 moves over and makes contact either with the contact 38 or 39, depending upon the direction of flow of the current, thus making a holding circuit for the relay 24. At the same time, either the contact 58 or 57 is made, thus energizing the red lamp 21 only through the circuits first named.

By reference to Fig. 6 it will be seen that if the circuits to be tested are even in number, it is necessary to connect one of them in series-parallel relation with one of the others. Thus, the circuits $C^1$, $C^2$ and $C^3$ are connected respectively to the lines S, R and T. The circuit $C^4$ of such cable C is connected through the diode 23 and resistor 22 to the take-off point through the lead T in the adaptor 16. Therefore, with the other diodes 23 connected as illustrated between the circuits $C^2$—$C^3$ and $C^2$—$C^1$, any misconnection of the circuits as by transposing the end of $C^3$ next to resistor 22 with the end of $C^2$ next to the diodes 23 would cause a change in the overall resistance of the cable C. Thus, when connected into the bridge network shown in Fig. 3 this would indicate a fault.

In Fig. 7 I show a means of testing only two circuits $C^1$ and $C^2$. In this case the line S leads first to the resistor 22 and then to diode 23 to connect to the line R and the line C¹ as shown. The line T is connected to C² through a resistor and diode directed as indicated.

Referring now to Fig. 8 of the drawings I show a modification of my invention in which I provide means positively to indicate a pattern misconnection of several of the conductors of the cable. That is, I show means to unbalance the bridge and thereto to indicate a fault in the cable under those conditions in which the connections may be misaligned in a fashion to cause the bridge to remain balanced.

In Fig. 8 I show in full lines a series of circuits, C¹, C², C³, C⁴, etc., to be tested. The adaptors 16ᵃ and 18ᵃ carry the resistors and diodes connected as already explained. In addition, in the adaptor 18ᵃ I provide additional resistor-diode paths indicated at 22ᵃ and 23ᵃ connected as shown.

Let it be assumed that purposefully or by mistake the circuits are misconnected as indicated by the dotted lines. Thus, whereas the contact A of adaptor 16ᵃ should be connected to contact A of adaptor 18ᵃ, it has been connected to contact C of 18ᵃ; whereas contact B of adaptor 16ᵃ should be connected to contact B of adaptor 18ᵃ, it has been connected to contact D of adaptor 18ᵃ. Again, contact C of 16ᵃ is misconnected to contact A of 18ᵃ instead of being connected to C of 18ᵃ; contact D of 16ᵃ is misconnected to contact B of 18ᵃ. By inspecting the misconnection as indicated it will be apparent that there are precisely the same number of resistors and diodes in the same direction as if the conductors mentioned were properly connected. Therefore, when the complete circuit is put in as one side of bridge, as by the leads R and S, the bridge will not indicate an unbalance.

Observing now the effect of adding the resistors 22ᵃ and diodes 23ᵃ to such misconnected set of conductors, it will be readily apparent that if the misconnection shown exists the current will flow through the path of least resistance. That is, current will flow from bridge circuit R to A of 16ᵃ, to C of 18ᵃ, through the connected diode-resistor pair 23ᵃ—22ᵃ to B of 18ᵃ, to D of 16ᵃ, thence to S. Thus, such current passes through only three of the resistors instead of five if it followed the path of the dotted connections and if the auxiliary resistor-diode pairs were not provided. Unbalance thus is indicated. If the circuits are correctly connected the resistor-diode pairs 22ᵃ—23ᵃ remain passive, as the diodes are oppositely directed relative to current flow in properly connected circuits.

It will be noted that circuits C²—C³, C⁴—C⁵, etc. are, by the addition of the resistors 22ᵃ and diodes 23ᵃ, electrically connected in closed circuit pairs. In such closed pairs the diodes pass current in the same direction. However, with respect to current flowing in the entire group of circuits, if properly connected, diodes 23ᵃ are oppositely directed. Thus, the auxiliary pairs come into play only when there is misconnection of the cable circuits between the contacts of the end fittings.

From the foregoing it will be apparent that I have devised an improved process and apparatus for simultaneously and in effective manner testing all of the circuits of a multi-circuit cable or group of conductors. In actual practice my invention has proved to be extremely satisfactory. With the present diodes which may be had in sizes of about ⅟₁₆ inch in diameter by about ¼ inch long, and resistors 22 which may be about ³⁄₃₂ in diameter by about ⅜ inch long, a large number of these may be series connected and physically housed within adaptors 16 and 18 which ordinarily need be no larger in diameter than the overall dimensions of the connectors 15 and 17 on the ends of the cable.

While I have shown in the drawings and described herein a bridge network which is more or less a modified type of Wheatstone bridge, it will be apparent that the other forms of networks may be used. Likewise, it will be apparent that where a relatively few number of wires are to be tested it will be possible to do away with the center connection indicated by the wire R and simply to connect all of the wires or circuits of the cable C in series, following the scheme that the current would be permitted to flow only in one direction. Thus connected the whole group of conductors is connected to form one leg of the bridge network. The purpose in dividing the group of conductors into two groups is to make the instrument more sensitive, that is, to extend the operative range of the same. If the resistance of the circuits to be tested is high enough to bring the bridge in balance with the diodes in the circuits, it is possible to use the process and apparatus without adding extra resistance.

While I have shown my invention in several forms, it will be obvious to those skilled in the art that it is not so limited, but is susceptible of various other changes and modifications without departing from the spirit thereof, and I desire, therefore, that only such limitations be placed thereupon as are specifically set forth in the appended claims.

What I claim is:

1. The process of simultaneously testing the individual circuits of a multi-circuit group which comprises connecting the circuits at one end of the group in series with all others of the circuits at said end, connecting the circuits at the other end in series with all others of the circuits at said end except two thereof, connecting the said two circuits into a bridge network with one of the same being connected at one point of possible equal potential in the network, impressing a potential on the bridge network of a value to cause zero current flow across the bridge if the circuits under test are all good, and utilizing current flow across the bridge to energize a fault indicating signal device.

2. The process of simultaneously testing all of the circuits in a multi-circuit cable which comprises substantially simultaneously connecting all of the circuits at one end of the cable in series with each other through separate diodes, substantially simultaneously connecting all of the circuits at the other end of the cable except two thereof in series with the adjacent ends whereby the entire group of circuits is series connected through unidirectional current flow means, connecting the unconnected ends of said two circuits into a bridge network whereby the entire group of circuits forms one leg thereof, impressing a potential on the bridge of a value to cause zero current flow through the group of circuits if all of the same are good, and utilizing current flow across the bridge occasioned by the unbalancing of the same to energize a fault indicator signal.

3. The process of simultaneously testing the individual circuits of a multi-circuit group which comprises the steps of connecting the circuits at one end of the group in series with each other through series connected resistor-diode pairs, connecting the circuits at the other end of the group in series through series connected resistor-diode pairs except for at least two of said circuits, connecting said two circuits to the points of zero current flow in a bridge network which is balanced against the total resistance of said connected circuits, impressing a potential on said network of a value to cause current to flow across said network if the total resistance of said circuits is different than that required to keep the bridge in balance, and utilizing the flow of current across the bridge to indicate the presence of a fault in the multi-circuit group.

4. In apparatus for simultaneously testing the circuits of a multi-circuit cable, the circuits of which are wired to multi-contact connectors at each end of the cable, an adaptor connector for one end of the cable in which are mounted and wired in series with the contacts of the adaptor connector a resistor-diode pair for each pair of wires to be connected, a second adaptor connector for the other end of the cable in which there are mounted and wired in series with all the contacts except at least two thereof series connector resistor-diode pairs, whereby connecting said adaptors with their respective connectors at the ends of the cable puts the circuits of the cable in series, a bridge network balanced for zero current flow thereacross upon including said series connected circuits as one leg thereof, a source of potential, a switch in circuit with the bridge network and said source of potential, and means in said bridge circuit effective upon a flow of current across the bridge to give a signal, thereby indicating a fault in said cable circuit.

5. In apparatus for testing the circuits of a multi-circuit cable having the ends of each circuit connected to the contacts of connectors placed at each end of the cable, a pair of adaptors having contacts cooperable with the connectors at each end of the cable, a series connected resistor-diode pair connecting substantially all of the contacts of the adaptors in series, at least two thereof in one adaptor being left unconnected whereby the circuits are substantially all connected in series through uni-directional current paths of higher resistance than the circuits themselves, means to impress a potential on said two circuits, and means to compare the flow of current in said group of series connected circuits with the flow of current produced by like potential in a test circuit, thereby to indicate the condition of the cable circuits.

6. Apparatus as defined in claim 5 in which one of said adaptors carries additional series connected resistor-diode pairs connected to the contacts thereof, thereby to connect the circuits of the cable in closed circuit pairs with said additional diodes directed to pass current in the same direction, whereby misconnection of the cable circuits between contacts of the end connectors is reflected by a change in total resistance of the cable circuits.

References Cited in the file of this patent

UNITED STATES PATENTS 2,635,135   Lamont _____ Apr. 14, 1953

FOREIGN PATENTS 709,737   Great Britain _____ June 2, 1954